United States Patent [19]
Brok

[11] Patent Number: 5,191,621
[45] Date of Patent: Mar. 2, 1993

[54] METHOD AND DEVICE FOR DETERMINING A MODULATION TRANSFER FUNCTION OF A DIGITAL IMAGING SYSTEM

[75] Inventor: Marius Brok, Eindhoven, Netherlands

[73] Assignee: U.S. Philips Corp., New York, N.Y.

[21] Appl. No.: 709,665

[22] Filed: Jun. 3, 1991

[30] Foreign Application Priority Data

Jun. 5, 1990 [NL] Netherlands ............... 9001265

[51] Int. Cl.$^5$ .................. G06K 9/00; G01D 18/00
[52] U.S. Cl. ............................ 382/1; 382/43; 378/207
[58] Field of Search ............... 382/6, 1, 43; 378/207

[56] References Cited

U.S. PATENT DOCUMENTS

| 4,259,579 | 3/1981 | Geary | 378/207 |
| 4,947,323 | 8/1990 | Smith | 382/6 |
| 5,056,130 | 10/1991 | Engel | 378/207 |

*Primary Examiner*—David K. Moore
*Assistant Examiner*—Barry Stellrecht
*Attorney, Agent, or Firm*—Jack D. Slobod

[57] ABSTRACT

To determine the asymmetry of the line spread function in digital imaging systems, two modulation-transfer functions are calculated by differentiation of the edge spread function followed by Fourier transformation. To that end a method is used in which a radiation intensity distribution spatially modulated by a series of equidistant elongated block elements in a test object is incident upon an input screen of a detector which is connected to a digital data processing device for storing detector signal values in memory locations which correspond to picture elements of the input screen. In the data processing device first values and derived by differentiating detector signal values for picture elements located along a picture line which extends across the series of block elements, and thereafter from positive and negative derivative values there is calculated by Fourier transformation respective two sequences of frequency-consecutive local maxima, from whose envelope the respective two modulation-transfer functions are determined.

8 Claims, 4 Drawing Sheets

METHOD AND DEVICE FOR DETERMINING A MODULATION TRANSFER FUNCTION OF A DIGITAL IMAGING SYSTEM

FIELD OF THE INVENTION

The invention relates to a method of determining a modulation-transfer function of a digital imaging system, in which a radiation intensity distribution which is spatially modulated by a test object is displayed on an input screen of a detector connected to a digital data processing system for storing detector signal values in memory locations which correspond to picture elements of the input screen.

The invention also relates to a device for putting the method into effect, an X-ray imaging system including such a device and a test object for use in such an X-ray system.

BACKGROUND OF THE INVENTION

A method of the type defined above is disclosed in: R. A. Sones, G. T. Barnes, "A method to measure the MTF of digital X-ray systems"; Med. Phys. 11(2), March/April 1984.

This article describes how in a digital imaging system, for example a radiography or fluoroscopy system, the modulation transfer function, abbreviated to MTF hereinafter, is determined. The MTF of an imaging system is an objective measure of the imaging quality thereof. In the absence of geometrical distortion an imaging system will display a sinusoidal intensity distribution on a detector input plane as a sinusoidal intensity distribution whose contrast is reduced and whose phase is shifted relative to the original intensity distribution. By dividing the ratio in the displayed intensity distribution by the contrast of the intensity distribution on the input plane of the detector, the MTF of the detector can be measured for a plurality of spatial frequencies. For a spatial frequency zero the MTF is 1, and decreases versus an increasing frequency to 0.

A more efficient manner of measuring the MTF of an imaging system is based on the fact that the MTF can be written as the modulus of the one-dimensional Fourier transform of the line spread function of the imaging system. The line spread function describes the image of a line, displayed by the detector, on the detector input plane. With digital detectors whose detector input plane is subdivided into a matrix of individual detection subplanes, or with imaging systems having an analog detector in which the detector signal values are stored in a digital memory, the problem arises that when the MTF is determined from the Fourier transform of the line spread function, aliasing occurs because of too low a sampling frequency. Aliasing is the occurrence of components of the spectrum of the displayed image at lower frequencies than the frequency to which the spectral components actually belong. The reason is that in the spatial frequency domain the spectrum of a sampled signal is a periodical version of the actual spectrum. When these periodic spectra overlap, reconstruction of the original spectrum is not possible. By structuring the test object as a plurality of equidistant parallel line elements in the form of radio-transparent narrow slits or radio-opaque thin wires having an element width substantially less than half the center-to-center spacing between line elements the center-to-center spacing with reference to the detector being equal to $(n+\frac{1}{2})$ times the inverse of the spatial sampling frequency, n being a natural number, the aliasing problem is obviated and the MTF can be determined by Fourier transofrming the detector signals which are proportional to the image to be displayed. A problem which occurs when, for example, an X-ray image intensifier tube is used as the detector, which is optically coupled to a television pick-up tube, is that scanning the input screen of the television pick-up tube may introduce an asymmetry in the line spread function.

SUMMARY OF THE INVENTION

The invention has inter alia for its object to provide a method with which a transfer function of a digital imaging system can be determined, which includes information on the extent of asymmetry of the line spread function. To that end, a method according to the invention, is characterized in that the radiation intensity distribution is spatially modulated using a test object having equidistant block elements (e.g. relatively wide slots), there first being determined in the data processing device the derivative of the detector signal values of the picture elements located along a picture line which extends transversely of the block elements, whereafter from a Fourier transform of the derivative value of the same polarity, a sequence of consecutive local maxima is determined, from an envelope of the maxima modulation transfer function is determined.

The use of block elements, having a width equal to, or a substantial fraction of half the center-to-center spacing between block elements enables asymmetry in the line spread function to be measured determined. The edge spread function describes the shape of the image of an abrupt intensity transition. Differentiating the edge spread function supplies positive and negative derived values for the ascending and descending edge, respectively. By separately Fourier transforming the positive derivative values and negative derivative values, two different MTF's can be determined which are a measure of the asymmetry of the line spread function. When with the aid of a plurality of parallel equidistant slots the line spread function is transformed in known manner into the modulation transfer function, additional information on the phase spectrum is required to characterize the asymmetrical line spread function. When in this case only the modulation transfer function is taken as a measure of the line spread function, a symmetrical line spread function is assumed to be present, as symmetrical signals f(x) for which it holds that: $f(x) = f(-x)$ have a real Fourier transform and are fully characterized by their modulus. An additional advantage of the use of a block-wise radiation intensity distribution is that more radiation is incident onto the detector, compared to a line-wise radiation intensity distribution. As a result thereof, the detector signal has a higher signal-to-noise ratio, so that the MTF can be calculated from a smaller number of measurements.

An embodiment of a method in accordance with the invention, is characterized in that, with a uniform illumination of the input screen, the detector signals are stored in memory locations which correspond to picture elements of the input screen, the derived values of the detector signals values then first being determined for picture elements located along the picture lines, whereafter a noise spectrum is calculated, which is subtracted from the envelope.

When radiation is detected by the detector, the radiation being converted in the input screen into light by means of, for example, an X-ray detector, or the radiation being converted into a charge pattern by means of a television pick-up tube, the image formed by the detector includes a noise component at low radiation intensities. This what is commonly denoted quantization noise is caused by the fact that detection of the radiation quanta is a stochastic process with a predominantly flat spectrum (white noise). When a line-wise modulated radiation intensity is applied to the detector, then in the presence of white noise an MTF is found after Fourier transforming the detector signal values which, compared to the MTF found in the absence of noise differs by a factor equal to the standard deviation of the white noise. If however in the case of a block-wise modulated radiation intensity preceding the Fourier transformation the detector signal values are differentiated, this alters the noise spectrum which is no longer constant but increases from zero at 0 Hz. An accurate MTF can be found by separate calculation of the noise spectrum and subtraction of this noise spectrum from the Fourier transformed detector signal.

A device suitable for use in the method in accordance with the invention includes a data processing device which is capable of being coupled to a detector and includes a storage portion for storing the detector signal values and a computer portion for calculating the derived values of the detector signal values and for calculating the modulation-transfer function from the derived values.

A microprocessor or general purpose computer controls sampling of the detector signals and storage of the detector signals in, for example, a $(512)^2$ byte RAM. An algorithm which is, for example, stored in a ROM differentiates the detector signal values located along picture lines and calculates the Fourier transformed values from the differentiated values in accordance with a Fast- Fourier transform-algorithm. After subtraction of the noise spectrum the MTF values can be applied to a display device via a D/A converter. In cooperation with a test object formed by a copper plate, such a device can be used in X-ray imaging systems in which the detector is constituted by an X-ray image intensifier tube and a television pick-up device cooperating therewith. X-ray radiation emitted by an X-ray source impinges through the slots in the copper plate onto the X-ray image intensifier tube which converts the block-like X-ray image into a luminous image which is converted by the television pick-up device into a detector signal. In this situation the width of the slots in the copper plate when displayed on the input screen of the X-ray image intensifier tube is large relative to a picture element. Good test results are obtained using a test object made of copper having a thickness of substantially 0.5 mm, a slot width of 5 mm and a relative slot spacing of 5 mm, the test object being placed against the input screen of the X-ray image intensifier tube.

Some embodiments of a method and device in accordance with the invention will now be described in greater detail with reference to the accompanying drawing. In the drawing:

FIG. 1 shows an X-ray imaging system provided with a device for determining the MTF of an imaging system, FIG. 2 shows a test object according to an embodiment of the invention, FIG. 3 shows detector signal values in an image of the test object of FIG. 2, FIG. 4 shows the derived values of the detector signal values shown in FIG. 3, FIGS. 5a to FIG. 5d show Fourier transforming of a line spread function sampled in discrete picture elements, FIG. 6 illustrates the determination of the MTF from the envelope of local maxima in a spectrum in accordance with FIG. 5d, FIG. 7 shows the MTF of positive and negative edge transition, determined from the derived values, and FIG. 8 shows a device for determining the MTF of an imaging system.

DESCRIPTION OF THE PREFERRED EMBODIMENT

Figure 1:
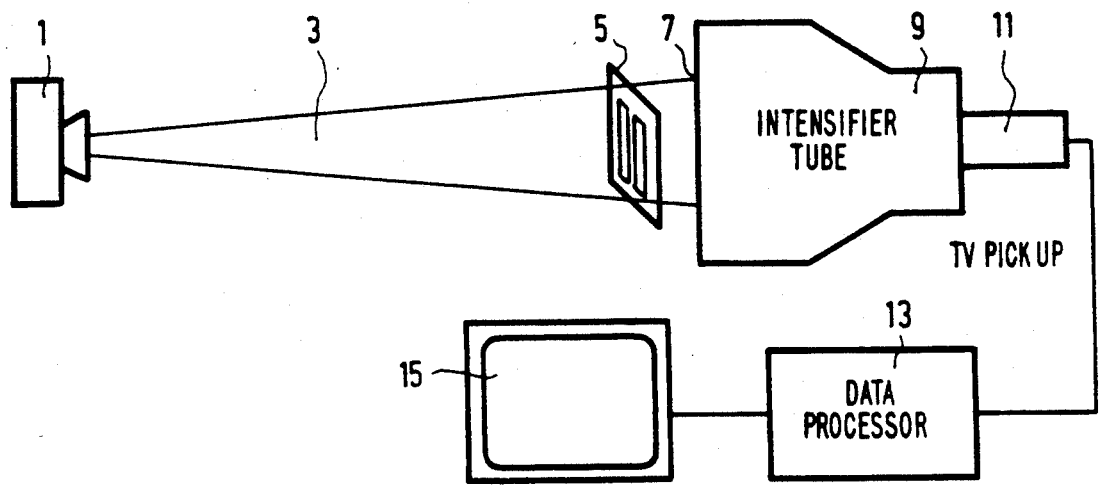

FIG. 1 shows an X-ray source 1 emitting an X-ray beam 3 which passes through a test object 5. The test object 5 spatially modulates the intensity of the X-ray beam in a block-wise manner. The radiation intensity distribution is converted on the input screen 7 of an X-ray image intensifier tube 9 into a luminous image which is detected by a television pick-up device 11 and converted into a detector signal. The detector signal is applied to the data processing device 13 and is stored in memory elements which correspond to picture elements of the image of the test object 5 on the input screen 7.

Figure 2:
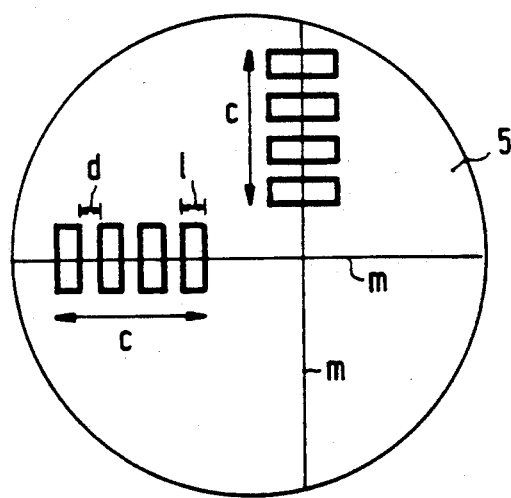

FIG. 2 shows a test object 5 in the shape of a copper disc approximately 0.5 mm thick. The disc incorporates a first set of four slots having a slot width, 1, of 5 mm and a relative slot spacing, d, of 5 mm, which are perpendicular to a second set of four slots. The X-ray beam is modulated spatially and block-wise by the slots and the MTF can be determined in two mutually perpendicular directions.

Figure 3:
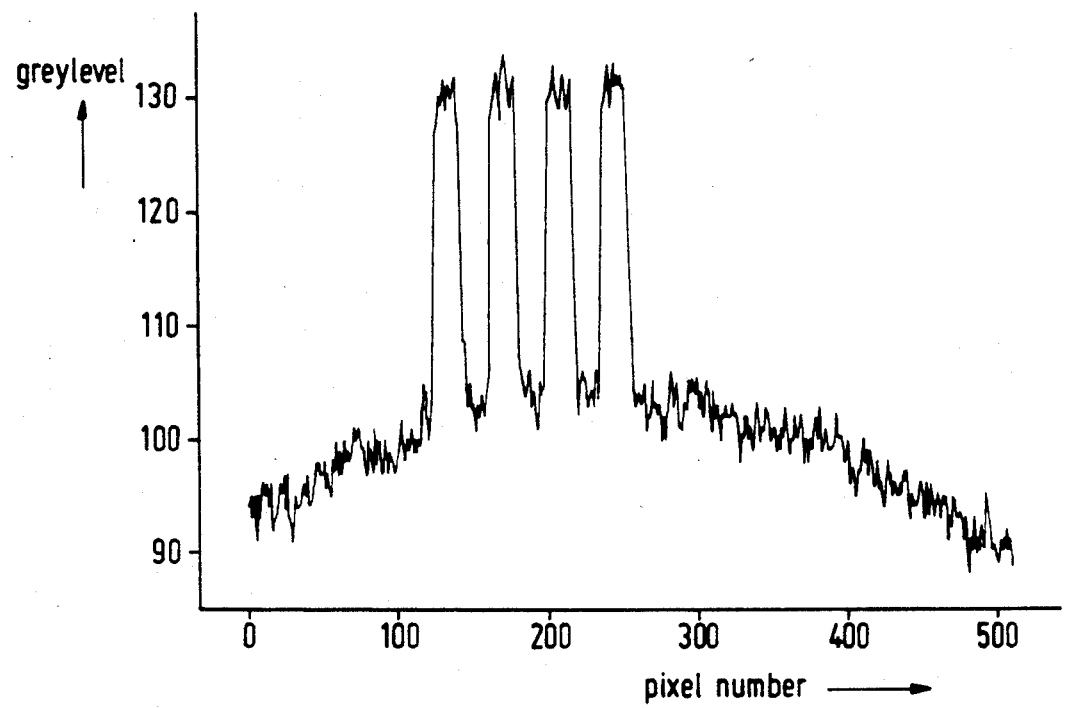

FIG. 3 shows the detector signal values stored in the data processing device 13 in memory locations which correspond to picture elements located along a picture line M in an image of the object 5. The number of the picture element is plotted on the horizontal, and a grey level assigned to the detector signal values and which may have a value of between 0 and 255 is plotted on the vertical line. The Figure illustrates the response of the detector to abrupt intensity transitions, and represents the edge spread function.

Figure 4:
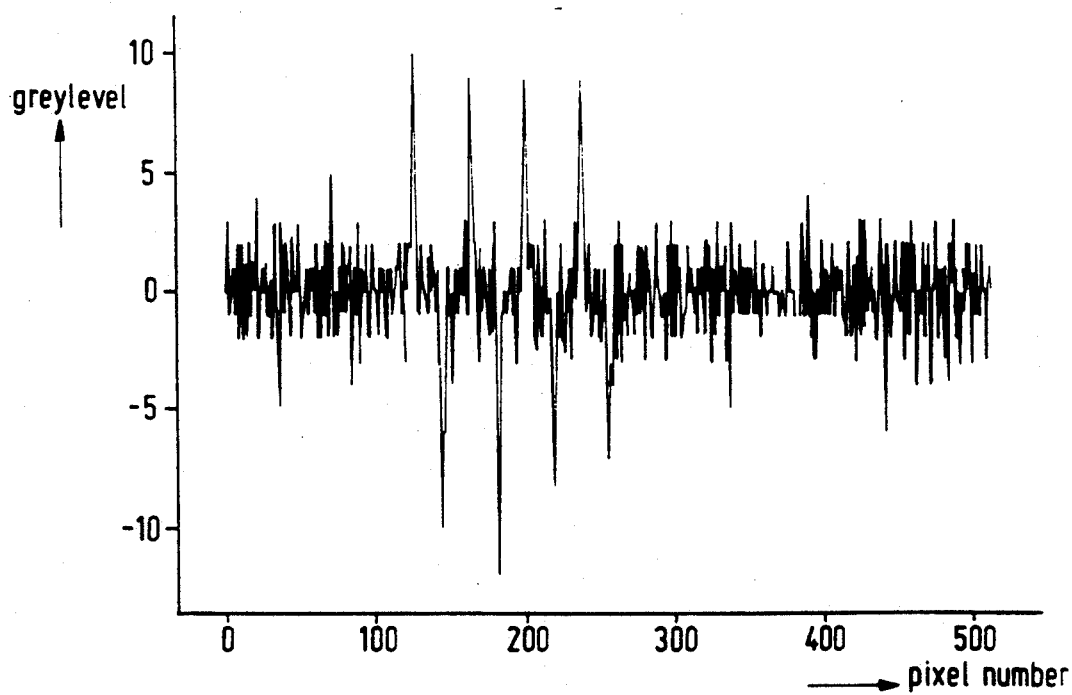

FIG. 4 shows the derivative values which are determined from the detector signal values. The line spread function $LSF(x_k)$, wherein $x_k$ is a number of a picture element on a picture line, is given by finite difference approximation of the derivative of the edge spread function, $ESF(x_k)$:

$$LSF(x_k) = \frac{(ESF(x_k) - ESF(x_{k-1}))}{x_k - x_{k-1}}$$

Differentiation of the detector signal values in FIG. 3 in the manner described above results in four equidistant positive and four equidistant negative peaks. By considering the positive and negative peaks separately, two MTF's can be calculated which represent the asymmetry of the line spread function.

Figure 5A:
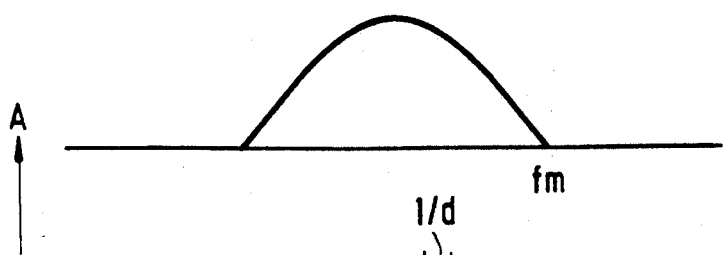
Figure 5B:
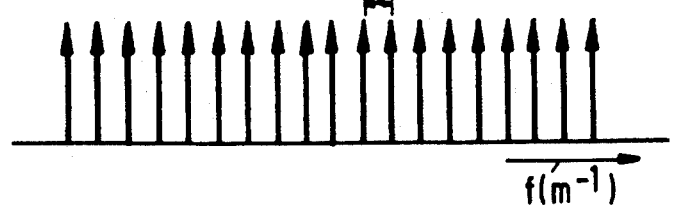
Figure 5C:
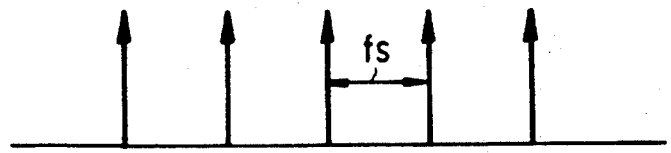
Figure 5D:
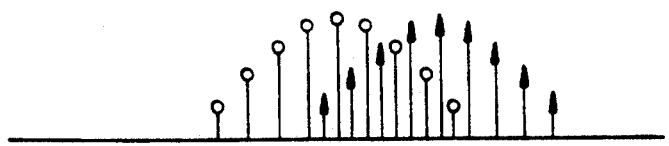

FIG. 5a is a schematical representation of the Fourier transform of the line spread function, which is equal to the MTF. A finite sequence of line spread functions (four in this case) is represented by convolution of the line spread function by a pulse train, followed by multiplication by a rectangular function of finite width. In the spatial frequency domain the Fourier transform of a finite sequence of line spread functions is represented by multiplying the MTF by a pulse train, followed by convolution with a sinc-function: [sinc(x)=sin(x)/x]. From FIG. 4 it is obvious that the line spread function is stored in the data processing device 13 in discrete spots. For an accurate reconstruction of a signal sampled in discrete spots it is required in accordance with the Nyquist criterion that a spacing Tn between two picture elements must satisfy: Tn≦ [1/(2$f_m$)], wherein $f_m$ is the highest frequency occurring in MTF. However, even if the spacing between two adjacent picture elements in the image of the test object amounts to Δx wherein Δx>Tn, it is still possible under certain conditions to determine an accurate MTF from the line spread function. This is illustrated in FIGS. 5a–5d. The line spread function as shown in FIG. 4 is transformed by Fourier transformation into MTF's and, after transformation, have the shape shown in FIG. 5d. The line spread functions are shown as a sequence of pulse functions convolved with the line spread function. In the spatial frequency domain this is represented as a multiplication of FIG. 5a and 5b. Sampling the line spread function in discrete spots at a mutual spacing Δx is represented in the frequency domain by convolution with a sequence of pulse functions at a relative spacing $f_s$, wherein $f_s > 2f_m$. The result of these processing operations is shown in FIG. 5d. The original MTF can be reconstructed from the envelope of the discrete MTF values. For the sake of clarity, FIG. 5d shows pulse functions, by assuming the pulse sequence in FIG. 5b to be infinitely long. Because of the finite number of slots in the test object this is however not the case, and the pulse functions in FIG. 5d have a given width (they are actually sinc-functions), so that the MTF can be obtained from the envelope of the local maxima.

Figure 6:
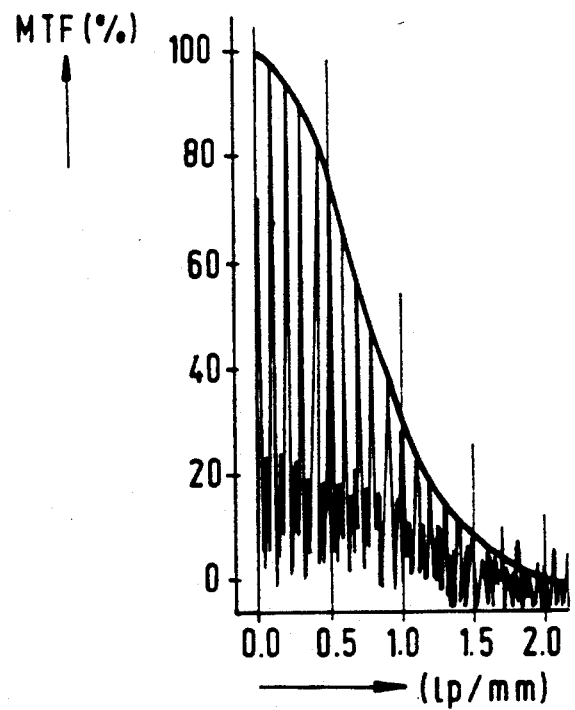

In FIG. 6 the MTF is determined, after subtraction of the noise spectrum, from the envelope of the local maxima. The derivative values of FIG. 4 are represented as a convolution of the line spread function LSF(x) with a pulse sequence comb(x/d). The finite width C of the set of slots in the test object is given by multiplication by the rectangular function rect (x/c) and the sampling in discrete spots with a center-to-center spacing Δx between picture elements is given by multiplication by the pulse sequence comb(kΔx). In the data processing device 13, after differentiation in the memory locations corresponding to picture elements on a picture line, the detector signal values I(x) are stored for which it holds that:

$$I(x) = [LSF(x)*Comb(x/d)].rect(x/c).comb(k\Delta x).$$

After Fourier transforming of the differentiated detector signal values a signal is obtained, given by:

$$DFT[I(x)] = [MTF(f).comb(x/d)]*sinc(fc)*comb(f_s).$$

Herein the operation DFT means: discrete Fourier transforming. From the above formula it appears that the MTF is the envelope of a plurality of consecutive sinc functions (comb(fd)*sinc(fc) which repeats itself at the sampling frequency $f_s$.

Figure 7:
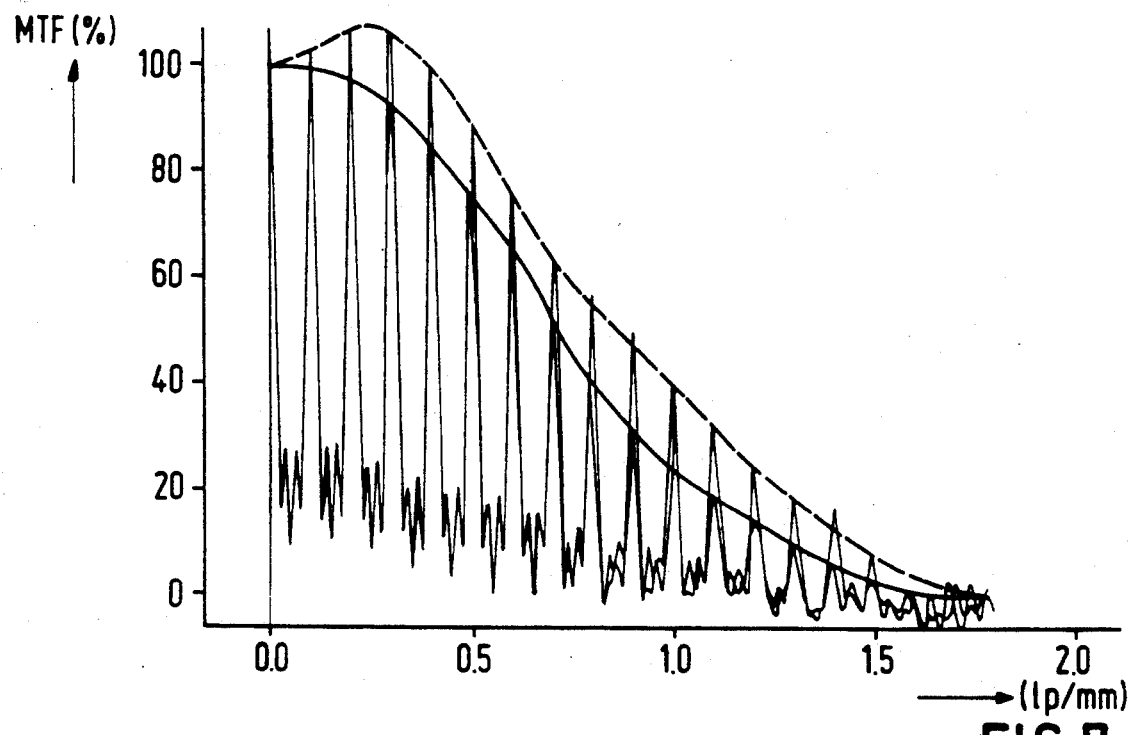

FIG. 7 shows the two MTF'S determined from the positive and the negative derivative values respectively. There appears to be a significant difference between the MTF'S because of the asymmetry of the line spread function.

Figure 8:
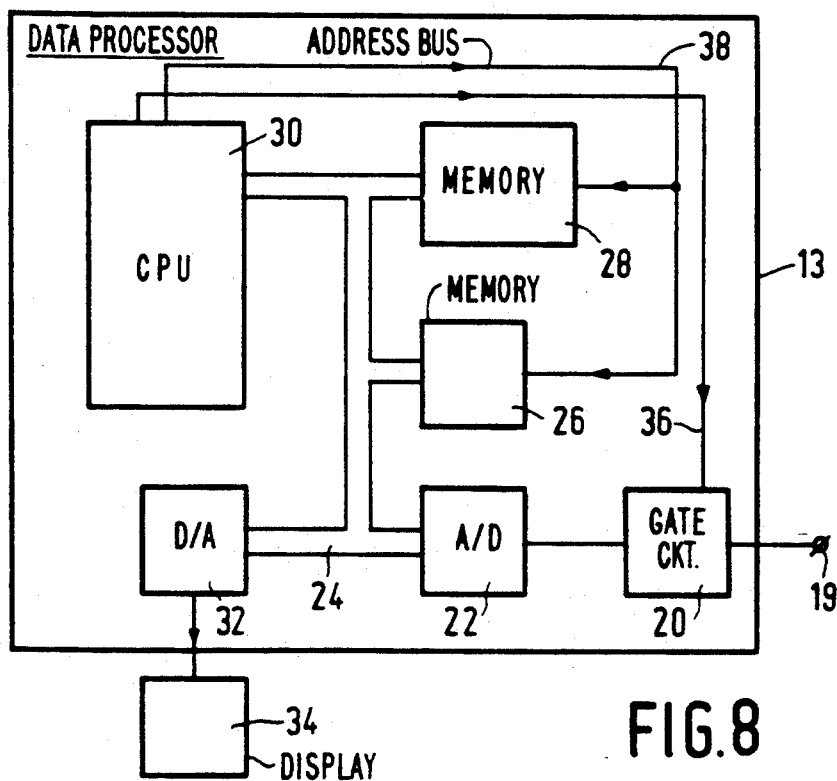

FIG. 8 shows a device for the determination of the modulation-transfer function comprised of a data processing device 13 and a display unit 34. A gate circuit 20, having a terminal 19 for connection to a detector, is connected to an analog-to-digital converter 22. The analog-to-digital converter is connected to a data bus 24 which is connected to a ROM 26, a RAM 28 and a CPU 30. The data bus is also connected to a digital-to-analog converter 32 connected to display device 34, for example a television monitor. Via a control line 36 the CPU activates, during the determination of the MTF of an imaging system, the gate circuit 20, so that the detector signal values of a detector connected to the terminal 19 arrive at the A/D converter 22. Via the data bus detector signal values which were digitized in for example $2^8$ steps are applied to the data input of the memory 28 which has, for example, a matrix of $512^2$ memory locations of 8 bits each. Each memory location in the memory 28 corresponds to a picture element in an image detected by the detector. Storage of the detector signal values in the memory 28 is controlled by the CPU 30 which addresses the memory locations of the memory 28 via the address bus 38. The memory 26 contains instructions for the CPU 30, which first comprise a differentiation of the signal values stored in the memory 28 followed by Fourier transformation of the differentiated values and determination of the MTF from the envelope of the local maxima of the Fourier transformed, differentiated detector signal values. The contents of memory locations positioned along rows or columns are thereafter applied via the data bus 24 to the D/A converter 32 and displayed on the display unit 34, for example a television monitor or printed on a printer.

What is claimed is:

1. A method of determining a modulation-transfer function of an imaging system in which a beam of radiation from a radiation source is incident on an input surface of a detector of signal values of picture elements corresponding to the spatial distribution of the incident radiation, comprising:

positioning a test object in said beam at a location intermediate said source and said input screen to modulate the spatial distribution of radiation incident upon said input surface, said test object comprising a series of equally spaced apart block elements, said series of block elements producing alternate ascending and descending edges in the distribution, along a picture line directed across said series of block elements, of the intensity of radiation incident upon said input surface;

detecting, with said detector, the signal values of consecutive picture elements along said picture line;

differencing the signal values of successive pairs of adjoining picture elements along said picture line to determine respective first and second sets of derivative values, said first set being of positive derivative values produced by said ascending edges and said second set being of negative derivative values produced by said descending edges;

Fourier transforming the first and second sets of derivative values;

determining first and second sequence of local maxima from the Fourier transforms of the respective first and second sets of derivative values; and determining first and second modulation-transfer functions from respective envelopes of said first and second sequences of local maxima.

2. A method as claimed in claim 1, wherein said determining first and second modulation transfer functions from respective envelopes of said first and second series of local maxima includes a step of subtracting a noise spectrum from said envelopes, said noise spectrum being determined without said test object so positioned in order to produce a uniform distribution of radiation incident upon said input surface.

3. A method of determining a modulation-transfer function of an imaging system in which a beam of radiation from a radiation source is incident on an input surface of a detector of signal values of picture elements corresponding to the spatial distribution of the incident radiation, comprising:

positioning a test object in said beam at a location intermediate said source and said input screen to modulate the spatial distribution of radiation incident upon said input surface, said test object comprising a series of equally spaced apart block elements, said series of block elements producing alternate ascending and descending edges in the distribution, along a picture line directed across said series of block elements, of the intensity of radiation incident upon said input surface;

detecting, with said detector, the signal values of consecutive picture elements along said picture line;

differencing the signal values of successive pairs of adjoining picture elements along said picture line to determine derivative values;

Fourier transforming the derivative values of a predetermined same polarity;

determining a sequence of local maxima from the Fourier transformed derivative values of the predetermined same polarity; and determining a modulation-transfer function from an envelope of said sequence of local maxima.

4. A method as claimed in claim 3, wherein said determining a modulation-transfer function from an envelope of said of local maxima includes a step of subtracting a noise spectrum from said envelope, said noise spectrum being determined without said test object so positioned in order to produce a uniform distribution of radiation incident upon said input surface.

5. In an imaging system in which a beam of radiation from a radiation source is incident on an input surface of a detector, and digital signal values of picture elements corresponding to the spatial distribution of the incident radiation are stored in a memory, an apparatus for determining a modulation-transfer function, comprising:

a test object positioned in said beam at a location intermediate said source and said input screen to modulate the spatial distribution of radiation incident upon said input surface, said test object comprising a series of elongated equally spaced apart block elements, said series producing alternate ascending and descending edges in the distribution, along a picture line directed across said series of block elements, of the intensity of radiation incident upon said input surface;

processing means coupled to said memory means, said processing means comprising means for:

reading from said memory means signal values of consecutive picture elements along said picture line;

differencing the signal values of successive pairs of adjoining picture elements along said picture line to determine derivative values;

Fourier transforming the derivative values of a predetermined same polarity;

determining a sequence of local maxima from the Fourier transformed derivative values of the predetermined same polarity; and determining a modulation-transfer function from an envelope of said sequence of local maxima.

6. An apparatus as claimed in claim 5, wherein said radiation is X-ray radiation and said test object comprises a plate of material and thickness rendering it substantially opaque to X-ray radiation and wherein said block elements are slots in said plate which are substantially transparent to said X-ray radiation.

7. An apparatus as claimed in claim 6, wherein said slots are have a width substantially equal to half their center-to-center spacing.

8. An apparatus as claimed in claim 6, wherein said plate is copper and has a thickness of substantially 0.5 mm.

* * * * *